(12) United States Patent
LoCascio et al.

(10) Patent No.: US 7,200,302 B2
(45) Date of Patent: Apr. 3, 2007

(54) PLANAR LIGHTWAVE FABRY-PEROT FILTER

(75) Inventors: Michael LoCascio, Albany, NY (US); Clinton T. Ballinger, Burnt Hills, NY (US); Daniel P. Landry, Clifton Park, NY (US)

(73) Assignee: Evident Technologies, Troy, NY (US)

( * ) Notice: Subject to any disclaimer, the term of this patent is extended or adjusted under 35 U.S.C. 154(b) by 0 days.

(21) Appl. No.: 10/372,823

(22) Filed: Feb. 26, 2003

(65) Prior Publication Data

US 2004/0033020 A1    Feb. 19, 2004

Related U.S. Application Data

(60) Provisional application No. 60/359,349, filed on Feb. 26, 2002.

(51) Int. Cl.
G02B 6/26    (2006.01)
G02B 6/00    (2006.01)
(52) U.S. Cl. .................. 385/39; 385/31; 385/129
(58) Field of Classification Search ........... 385/31, 385/37, 39, 47, 129–132
See application file for complete search history.

(56) References Cited

U.S. PATENT DOCUMENTS

| 5,838,870 A * | 11/1998 | Soref ................ 385/131 |
| 6,580,863 B2 * | 6/2003 | Yegnanarayanan et al. . 385/132 |
| 2003/0040134 A1 * | 2/2003 | Deliwala ................ 438/22 |

* cited by examiner

*Primary Examiner*—Sung Pak
(74) *Attorney, Agent, or Firm*—Kenyon & Kenyon LLP

(57) ABSTRACT

An optical filter includes a first mirror, a cavity coupled to the first mirror, and a second mirror coupled to the cavity. The first and second mirrors are formed of periodic trenches etched into the surface of a waveguide.

8 Claims, 4 Drawing Sheets

PLANAR LIGHTWAVE FABRY-PEROT FILTER

RELATED APPLICATIONS

This application claims the benefit of U.S. Provisional Application No. 60/359,349, filed Feb. 26, 2002.

FIELD OF THE INVENTION

The present invention is directed to a optical communication. More particularly, the present invention is directed to an optical wavelength filter.

BACKGROUND INFORMATION

One method to increase the amount of bandwidth in a fiber optic communication system is to transmit multiple streams of information-bearing data on different wavelengths in the same physical optical transmission system. This technique is referred to as wavelength division multiplexing ("WDM"). Implementations of this technique involving a higher number of densely packed channels are referred to as dense wavelength division multiplexing ("DWDM"). Prior-art examples of DWDM networks consist of multiple wavelength channels occupying the 1530–1560 nm (C-band) and 1565–1605 nm (L-band) ranges. They support either 40 channels spaced 0.8 nm (100 GHZ) apart or 80 channels spaced 0.4 nm (50GHz) apart, and are transmitted on the same physical fiber optic transmission cable.

One of the basic components required to steer each data-bearing wavelength channel through the DWDM network is an optical filter. Known examples of optical filters include Fabry-Perot etalons, dielectric thin film filters, arrayed waveguide gratings ("AWG"s), and fiber Bragg gratings.

Filters will have many possible uses in future WDM and DWDM networks such as the following:

A filter placed in front of an incoherent receiver can be used to select a particular signal from many arriving signals.

A filter placed in front of a broadband transmitter such as an LED can be used to select a particular wavelength in which to modulate data.

WDM networks are proposed which use filters to control which path through a network a signal will take.

There are disadvantages with the known DWDM filters, primarily in terms of cost, size, and functionality. Most commercially available DWDM filters are of the dielectric thin film type. In order to get smaller and smaller bandwidths that next generating DWDM networks are demanding using these filters, more and more thin film layers are required. Because each thin film deposition step is an independent process, the cost increases as more layers are added. Further, the product yield decreases due to the fact that every time a new layer is deposited there is some probability of an error occurring.

Based on the foregoing, there is a need for an improved WDM or DWDM filter.

DETAILED DESCRIPTION

Figure 1:
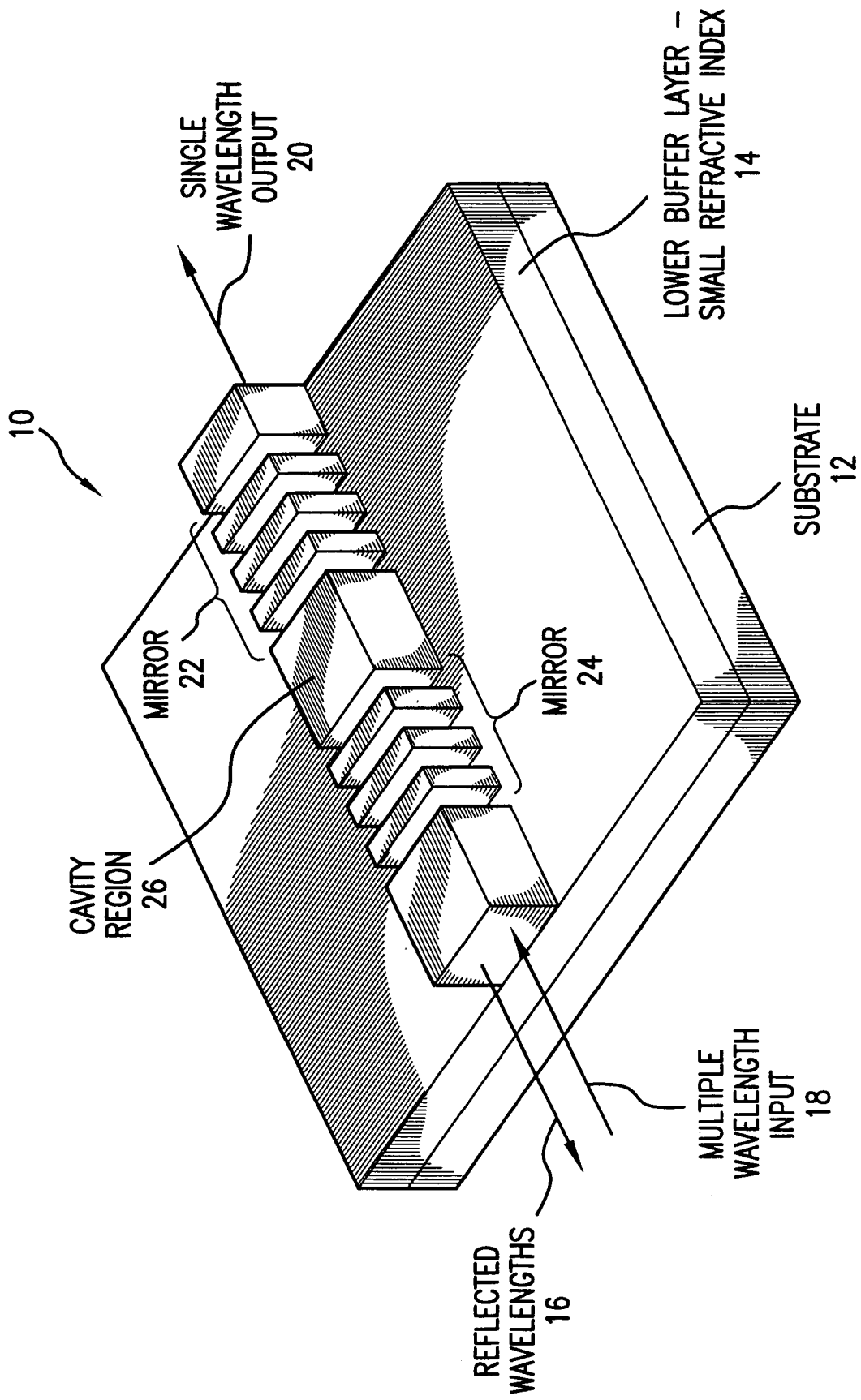
FIG. 1 is a perspective view of a Planar Lightwave Fabry-Perot filter in accordance with one embodiment of the present invention.

One embodiment of the present invention is an Planar Lightwave Fabry-Perot optical filter that allows for a single wavelength channel to be transmitted while reflecting all other wavelengths within a predefined wavelength region. FIG. 1 is a perspective view of a Planar Lightwave Fabry-Perot filter 10 in accordance with one embodiment of the present invention. Filter 10 includes a substrate 12 and a lower buffer layer 14. A series of periodic trenches etched into the surface of waveguide substrate material form a pair of mirrors 22 and 24 that are designed to reflect light at a specific wavelength range that is propagating through the waveguide.

A cavity 26 is formed between mirrors 22 and 24 and can be of a solid, liquid, gaseous material or vacuum. In one embodiment, cavity 26 is simply a region between mirrors 22 and 24 without the periodic trenches (i.e., the cavity could be composed of the substrate material if left unetched or of air/vacuum if etched completely away or filled with another material). The entire structure can be overlaid onto a straight waveguide that itself is etched into substrate 12. The function of the waveguide is to guide input broadband light 18 (i.e., many wavelength channels) to the filter and to guide at the opposite end single wavelength output light 20. In addition, the same input waveguide can guide away all the wavelength channels reflected by the filter (reflected wavelengths 16).

Figure 2:
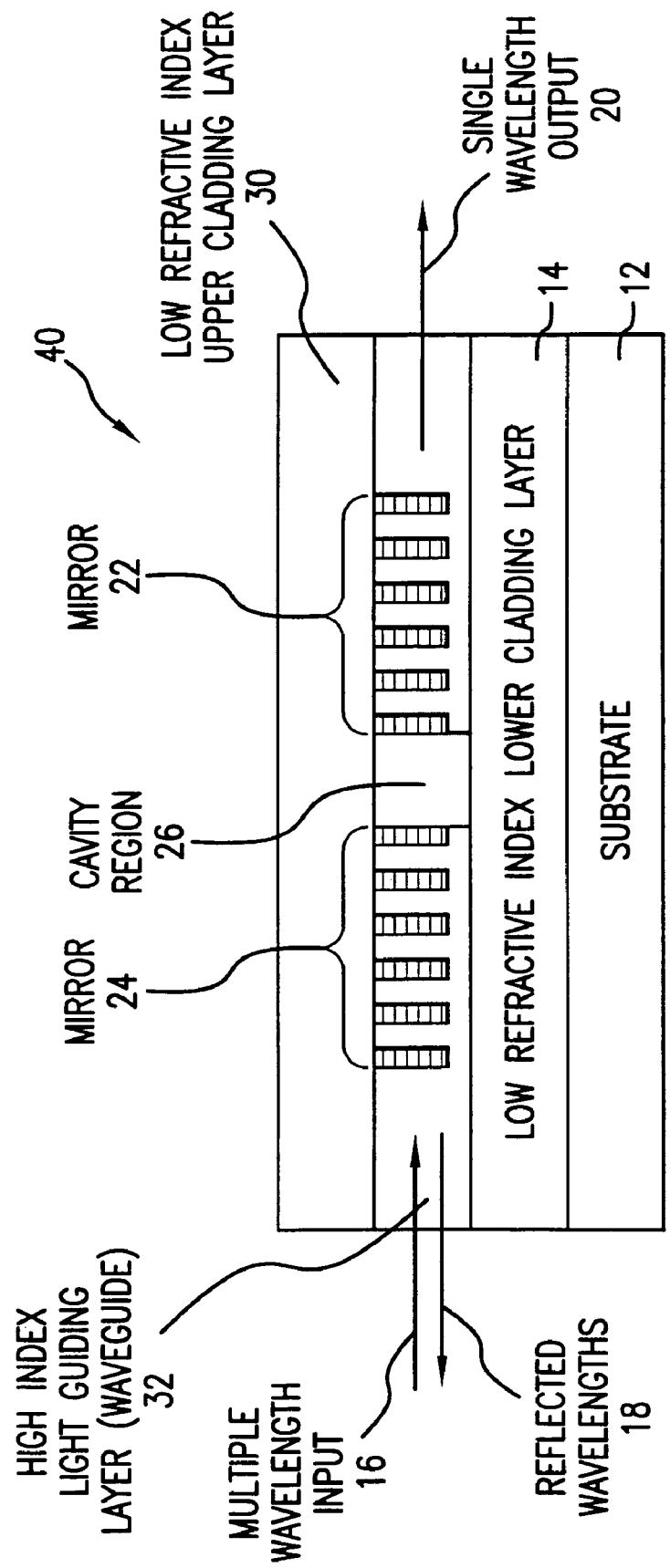
FIG. 2 is a side view of a Planar Lightwave Fabry-Perot filter in accordance with another embodiment of the present invention.

FIG. 2 is a side view of a Planar Lightwave Fabry-Perot filter 40 in accordance with another embodiment of the present invention. Filter 40 includes a low refractive index upper cladding layer 30.

In some embodiments of the present invention, in order to form a planar lightwave circuit such as Planar Lightwave Fabry-Perot Filters 10 and 40, in which light propagates within waveguides derived from a thin film, special substrates are required. Due to the laws of refraction, light bends towards materials having a higher refractive index and can be confined into thin films (or fibers) that have a higher refractive index than the surroundings. Thus, a thin film deposited on top of a substrate can guide light so long as it has a higher index than the underlying substrate. This upper thin film can in turn be etched or doped to form waveguides that further confine propagating light in the lateral direction. These waveguides are an optical equivalent to wires. An upper layer may be deposited on top of the waveguide so long as it has a lower refractive index than the underlying waveguide.

There are several examples of substrates designed to guide light all of which can be used to make Planar Lightwave Fabry-Perot filters 10 and 20, including Silicon on Insulator ("SOI"), Silica on Silicon ("SoS"), various polymer thin films on low index substrates, doped Lithium Niobate, etc.

There are several considerations when designing the waveguides of filters 10 and 40 that are formed either from etching or doping the light guiding layer. Etching away high index material, leaving only a stripe of material that can guide light, forms ridge type waveguides. These ridges can, in turn, have a layer deposited on top, forming a buried waveguide. Diffusing ions into a material along a line forms another type of waveguide called a diffused waveguide, where the increased index along that line can guide light. Any of these types of waveguides can be used with embodiments of the present invention.

Of importance is the number of modes that can propagate through the waveguide. Each mode has an associated propagation angle through the waveguide and because the spectral response of the resonator cavity is dependent n the propagation angle it is preferable to design the waveguide so that only one mode is possible. Constraining the lateral dimensions of the waveguide or decreasing the refractive index difference between the waveguide and surrounding media can achieve single mode propagation. The equation for the number of propagating modes is:

$$M \approx \frac{\pi}{4}\left(\frac{2d}{\lambda_0}\right)^2 (n_1^2 - n_2^2)$$

where M is the number of modes, d is the width and height of the waveguide (assuming a square cross section), $n_1$ is the refractive index of the waveguide and $n_2$ is the refractive index of the surrounding medium.

Regarding cavity 26, important design considerations are the Center Frequency (or Wavelength), the Free Spectral Range ("FSR") and the bandwidth (in terms of Full Width Half Maximum-FWHM). The cavity length and the reflectivity of the mirrors determine all three parameters when there is no absorption or scattering present. In embodiments of the present invention, the cavity length is simply the unetched stretch of waveguide that is between the periodically etched mirrors.

A Fabry-Perot etalon is a resonant cavity constructed from two parallel, highly reflective mirrors bounding a material (or vacuum) of thickness d. First consider an ideal resonator whose mirrors and cavity are lossless (i.e., no absorption or scattering losses). In this case the Center Frequency is periodic and is restricted to the discrete values:

$$\nu_F = q\frac{c}{2d}, q = 1, 2, \ldots$$

where c is the speed of light and d is the cavity length.

The Free Spectral Range is given by the frequency separation between adjacent resonance frequencies that are separated by a constant frequency difference:

$$\nu_F = \frac{c}{2d}$$

Using the Center Frequency and FSR equations, it can be shown that in order to obtain a large FSR a small cavity is required, where the smallest possible cavity in order to have a resonance at the desired frequency occurs when q=1.

The transmission as a function of frequency through a filter in accordance to embodiments of the present invention, with the approximation that there is no absorption or scattering loss is described by the following equation:

$$T(\nu) = \frac{1}{1 + \left(\frac{2 \cdot \sqrt[4]{R_1 R_2}}{1 - \sqrt{R_1 R_2}}\right)^2 \cdot \sin^2(2\pi \nu d / c)}$$

The Full Width Half Maximum ("FWHM") is the difference of the frequencies on both sides of the resonance peak when the Transmission is one half the peak value and can be found by solving the previous equation set for T=½. The FWHM is described by the following equation:

$$FWHM = \frac{c}{2\pi}\left(\frac{1}{2d}\ln\left(\frac{1}{R_1 R_2}\right)\right)$$

Based on this equation, the bandwidth decreases as the reflectivity of the mirrors increase given a fixed cavity length.

Each mirror 22 and 24 of embodiments of the Planar Lightwave Fabry-Perot filter is designed to have a desired reflectivity at operational frequency (wavelength) and to have a sufficiently large bandwidth as to create a reflectivity region that reflects all-other undesired wavelengths within a predefine wavelength region. For example it may be desirable to create a filter that only allows one wavelength channel within the c-band (1530–1560 nm) to be transmitted while reflecting all others. In this case the mirrors must maintain a high reflectivity over the entire c-band.

In embodiments of the present invention, the mirrors are formed by a periodic series of trenches that are etched into a planar waveguide and are oriented such that light propagating within the waveguide is perpendicular to the trenches. The etched trenches could be left open to air (or vacuum) or filled with a material having a different refractive index than the waveguide material. The center wavelength for mirrors is determined by the periodicity and duty cycle (the ratio of width of the etched trenches to that of the length of the entire period). The peak reflectivity (i.e., the reflectivity at the center wavelength) is determined by the number of periods comprising each mirror. The bandwidth of the mirror is determined by the index contrast between the etched trenches and the unetched portions of the mirror, where the effective index of the trench is determined by the depth of the etch into the waveguide.

Each etched trench and each subsequent unetched peak should ultimately have a width equal to an integer number of quarter wavelengths in the medium. Thus each trench and unetched portion of the mirror has a width given by:

$$w = \frac{q\lambda_0}{4n_{eff}},$$

or in terms of frequency $$w = \frac{qc}{4n_{eff}v_0}, q = 1, 2, 3, \ldots$$

q=1,2,3, . . .

where w is the width of the trench or unetched portion, $\lambda_0$ is the center wavelength, and $n_{eff}$ is the effective refractive index of the medium. The effective index is given by:

$$n_{eff} \approx \frac{n_{fill}h_{etch} + n_{wg}(h_{wg} - h_{etch})}{h_{wg}}$$

where $n_{wg}$ is the refractive index of the waveguide, $n_{fill}$ is the material that fills an etched trench (may be air or vacuum), $h_{wg}$ is the total height of the waveguide, and $h_{etch}$ is depth of the etched trench into the waveguide. As shown, for the unetched portions of the mirror $h_{etch}=0$ and the effective index is simply equal to that of refractive index of the waveguide material. If the trench is etched through the entire waveguide the refractive index of the trench becomes that of the material filling the trench. The longitudinal cross section of the mirrors can consist of any periodic structure including square profiles (i.e., trenches etched straight down), sinusoidal profiles, triangular etc.

The bandwidth of the mirrors is related to the difference in the refractive indices between the etched trenches and the peaks by $$\Delta\lambda = \frac{2}{\pi}\sin^{-1}\left(\frac{n_h - n_l}{n_h + n_l}\right)$$

or in terms of frequency $$\Delta v = c/\lambda_0^2 \frac{2}{\pi}\sin^{-1}\left(\frac{n_h - n_l}{n_h + n_l}\right)$$

where $n_h$ is the high index and $n_l$ is the lower refractive index. Note that the trench index could be higher than the unetched portion if the trench is filled with a high index material. Therefore by increasing the refractive index difference (usually by etching a deeper trench and filling with a material such as air that greatly differs from the refractive index of the native waveguide) the bandwidth of the mirrors becomes larger.

The mirror reflectivity at the center wavelength is a function of both the refractive index difference and the number of periods. Peak reflectivity is given by $$R_{peak} = \left(\frac{1 - \left(\frac{n_h}{n_l}\right)^{2p}}{1 + \left(\frac{n_h}{n_l}\right)^{2p}}\right)^2$$

where p is the number of periods. As the number of periods increases the reflectivity also increases.

Figure 3:
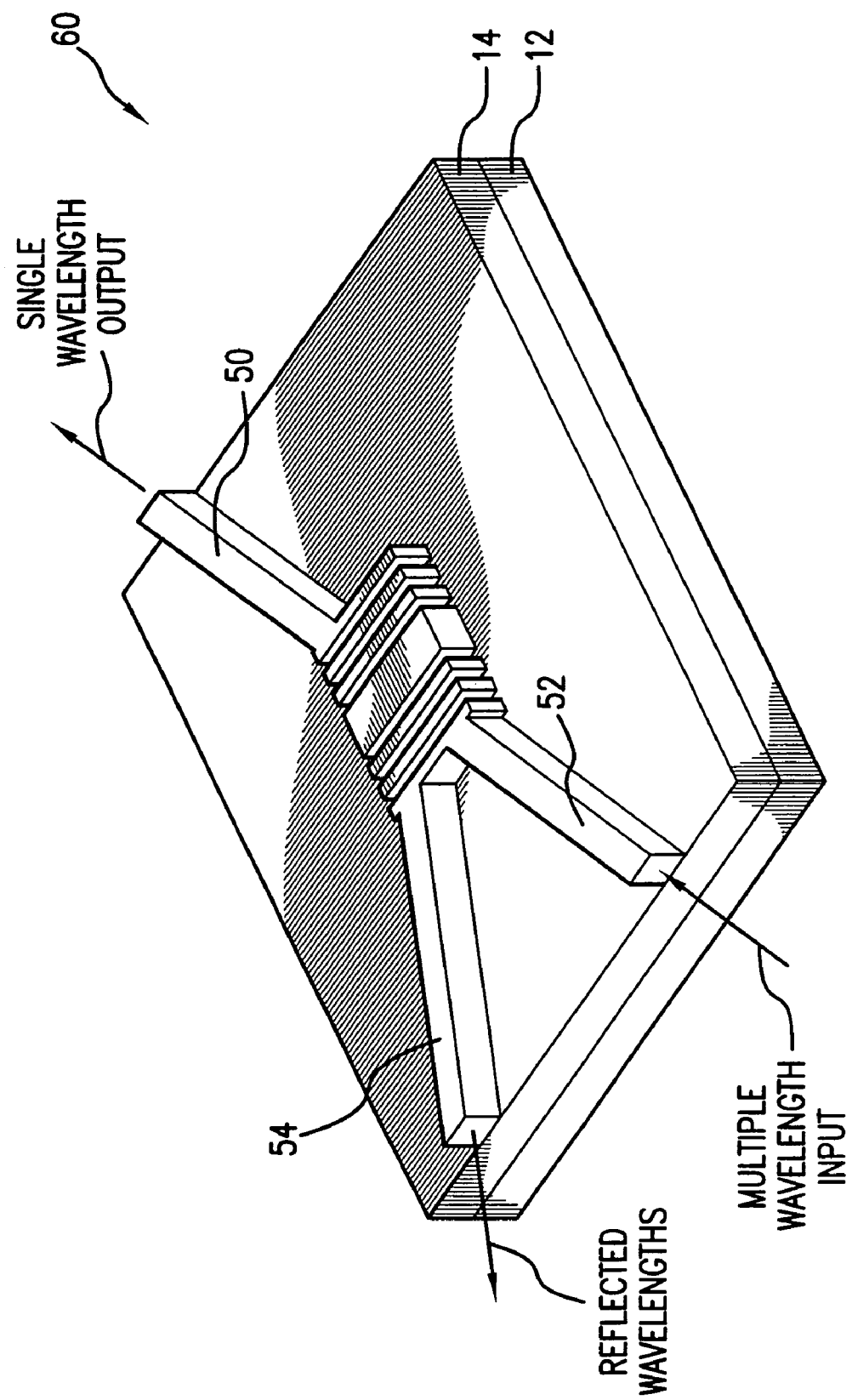
FIG. 3 is a perspective view of a Planar Lightwave Fabry-Perot filter in accordance with another embodiment of the present invention.

FIG. 3 is a perspective view of a Planar Lightwave Fabry-Perot filter 60 in accordance with another embodiment of the present invention. Filter 60 has an output waveguide 50 that outputs the single wavelength output. Filter 60 has another output waveguide 54 that outputs the reflected waveguides. In one embodiment, input waveguide 52 should be incident at some small angle with Planar Lightwave Fabry-Perot filter 60.

There are many advantages of the planar lightwave Fabry-Perot filter in accordance with the present invention over that of prior art DWDM filters primarily in terms of cost, size, and functionality. Most commercially available DWDM filters are of the dielectric thin film type. In order to get smaller and smaller bandwidths that next generating DWDM networks are demanding using these filters, more and more thin film layers are required. Because each thin film deposition step is an independent process the cost increases as more layers are added. Furthermore the product yield decreases due to the fact that every time a new layer is deposited there is some probability of an error occurring. The present invention avoids the problem of prior art DWDM filters of requiring more and more thin film layers because all features that determine the bandwidth are etched simultaneously in the present invention.

Embodiments of the present invention can range from 0.1 micron to 20 micron in width and 1–1000 microns in length depending on the material used and the bandwidth. Thus, they are inherently smaller than all other types of filters including AWGs.

The Planar Lightwave Fabry-Perot in accordance with the present invention has many uses in DWDM telecommunications. Single filters coupled to a circulator can add or drop single or multiple wavelength channels to or from a wavelength multiplexed optical data stream. Furthermore, a narrowband filter may precede a receiver and will filter all but the selected wavelengths from wavelength multiplexed data. Similarly, the Planar Lightwave Fabry-Perot filter can be placed after a broadband optical source in order to create a narrowband wavelength output from the broadband input.

Figure 4:
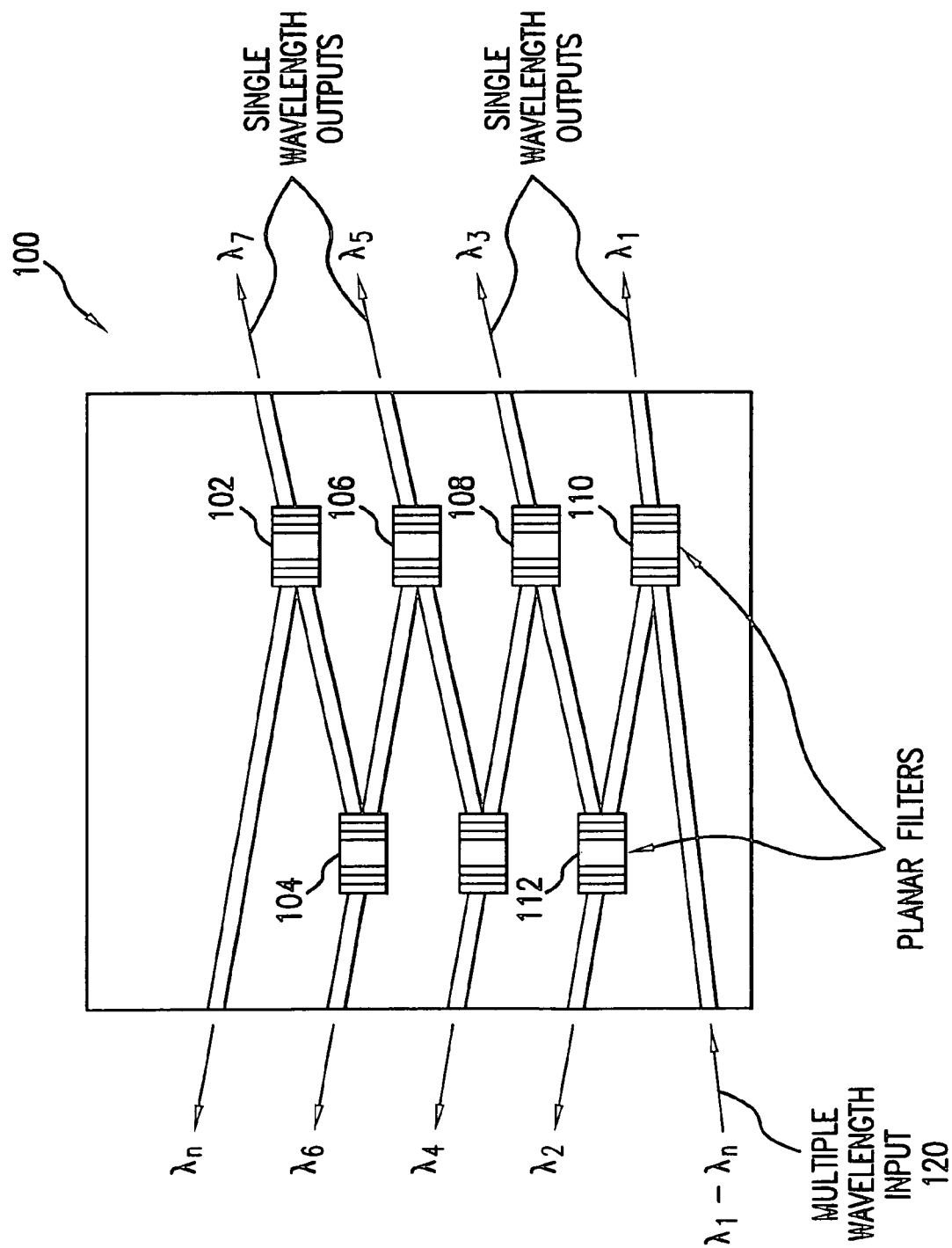
FIG. 4 is a side view of a module that includes many Planar Lightwave Fabry-Perot filters, each tuned to transmit a different wavelength channel, in accordance with another embodiment of the present invention.

FIG. 4 is a side view of a module 100 that includes many Planar Lightwave Fabry-Perot filters 102, 104, 106, 108, 110, 112, each tuned to transmit a different wavelength channel, arranged in an array (either monolithically on a single chip or on separate chips optically coupled together) where the reflected wavelengths from the preceding filter are the inputs to the succeeding filter. Thus, a multiple wavelength data stream 120 (having wavelengths $\lambda_1$–$\lambda_n$) can be demultiplexed, where each wavelength channel is separated into a separate optical fiber. In addition, module 100 could be run in reverse, where multiple input optical fibers, each having a distinct wavelength channel, are multiplexed into a single optical fiber carrying multiple wavelength channels.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:
1. An optical filter comprising:
  a first mirror;
  a cavity coupled to said first mirror; and
  a second mirror coupled to said cavity;

wherein said first and second mirrors each comprise a plurality of trenches etched into the surface of a waveguide, a desired propagation mode of the waveguide is selected by selecting a height of the waveguide, a width of the waveguide, a refractive index of the waveguide, and/or a refractive index of the surrounding medium, according to:

$$M \approx \frac{\pi}{4}\left(\frac{2d}{\lambda_0}\right)^2 (n_1^2 - n_2^2)$$

where M is the propogation mode, d is the width and the height of the waveguide, $n_1$ is the refractive index of the waveguide, $n_2$ is the refractive index of a surrounding medium and $\lambda_0$ is a center wavelength of the mirrors.

2. The optical filter of claim 1, wherein said trenches are periodic.

3. The optical filter of claim 1, wherein said cavity comprises a region of the waveguide without the plurality of trenches.

4. The optical filter of claim 1, wherein the waveguide is coupled to a lower cladding layer.

5. The optical filter of claim 4, wherein the waveguide is coupled to an upper cladding layer.

6. The optical filter of claim 4, wherein said lower cladding layer is coupled to a substrate.

7. The optical filter of claim 1, wherein the trenches are filled with a material having a different refractive index than the waveguide.

8. The optical filter of claim 1, wherein the cavity comprises one of a solid, liquid, gas or vacuum.

* * * * *